WILLIAMS & LEMON.
Churn Dasher.
No. 77,789.
Patented May 12, 1868.
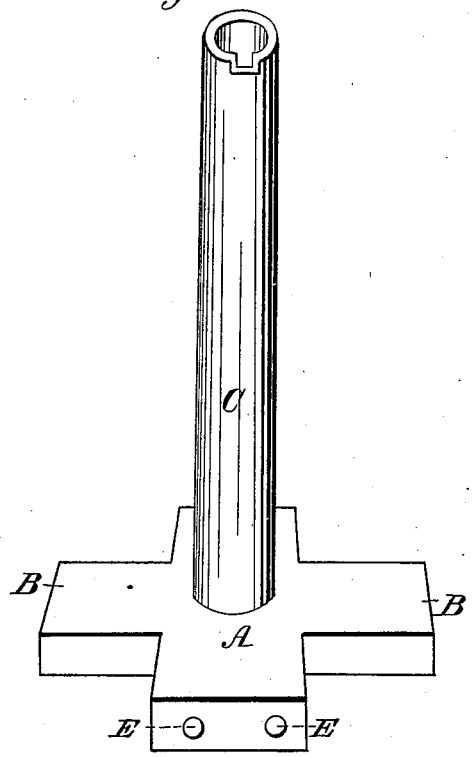
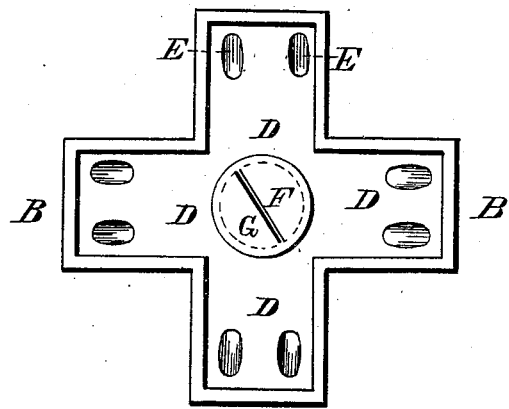

United States Patent Office.

JOHN E. WILLIAMS AND MICHAEL LEMON, OF BINGHAMTON, NEW YORK.

Letters Patent No. 77,789, dated May 12, 1868.

IMPROVEMENT IN CHURN-DASHER.

The Schedule referred to in these Letters Patent and making part of the same.

TO ALL WHOM IT MAY CONCERN:

Be it known that we, JOHN E. WILLIAMS and MICHAEL LEMON, of Binghamton, in the county of Broome, and State of New York, have invented a new and useful Improvement on Churn-Dashers; and we do hereby declare that the following is a full and exact description of the construction and operation of the same, reference being had to the accompanying drawings, making a part of this specification, in which—

Figure 1 represents the dasher and rod in a vertical position.

Figure 2 shows the lower surface of the dasher with the valve on the end of rod and holes in the dasher.

The letters of reference in each figure indicate like parts.

The nature of our invention consists of a churn-dasher, provided with four angular wings at right angles with each other, their length and breadth depending upon the inside diameter of the churn, on the under surface of which dasher there is a corresponding recess extending nearly to the ends of the wings which connects with an air-passage through the dasher-rod, and oblique openings extending through the outer edges of said wings, thereby equalizing the circulation of the air, and facilitating the rupture of the globules of the cream.

To enable others to make and use our invention, we will proceed to describe its construction and operation.

We construct our churn-dasher, A, of wood, with four angular horizontal wings, B B, with a hole in the centre to receive the end of the hollow rod C. We then make a recess, D, in the lower surface, nearly the full size of the dasher, leaving a narrow rim on the sides and ends of the wings. Through the bottom and near the edges of this recess we make oblique holes, E E, inclining outward, passing through the outer edges.

When we use a larger-sized churn, we extend the wings, and, if operated by the same motive-power, diminish their width or increase the number of oblique openings through their lateral edges.

To the lower end of the hollow dasher-rod we set a valve, F, which is held in its place, and works on a staple-shaped wire, G, the prongs of which pass through two holes near its edges, and on a transverse line through its centre, into the end of the rod. The ordinary valve used for this purpose is hinged on the side, while our valve works on the centre, thereby insuring a more equal and forcible circulation of air.

The recess D in our dasher is larger and differently constructed from those in ordinary use, which increases and varies the circulating currents of the air through the cream, causing it to impinge against the sides of the churn by its passage through the oblique openings E E, at the same time coming in contact with the upward current of cream, which also passes the angular points of the dasher-wings, thereby facilitating the rupture of the globules, and securing the desired temperature.

We disclaim all similar arrangements, and confine ourselves only to the novel features of our invention.

What we claim, and desire to secure by Letters Patent, is—

The combination of the dasher A, centre-hinged valve F, hollow shaft or dasher-rod C, and oblique openings E E through the edges of the wings, all being constructed substantially as herein described and represented for the purpose set forth.

JOHN E. WILLIAMS,
MICHAEL LEMON.

Witnesses:
 THEODORE H. GAGE,
 CALVIN CHAPMAN.